United States Patent
Kettler et al.

(10) Patent No.: US 7,300,066 B2
(45) Date of Patent: Nov. 27, 2007

(54) FOLDING FRAME FOR A TRICYCLE, SCOOTER OR CHILD'S BICYCLE

(75) Inventors: Heinz Kettler, deceased, late of Ense (DE); by Karin Kettler, legal representative, Ense (DE); Joachim Kettler, Ense (DE); Reinhold Rocholl, Soest (DE)

(73) Assignee: Heinz Kettler GmbH & Co. KG, Ense (DE)

( * ) Notice: Subject to any disclaimer, the term of this patent is extended or adjusted under 35 U.S.C. 154(b) by 0 days.

(21) Appl. No.: 11/717,097

(22) Filed: Mar. 13, 2007

(65) Prior Publication Data

US 2007/0182124 A1    Aug. 9, 2007

Related U.S. Application Data

(63) Continuation of application No. 11/081,875, filed on Mar. 17, 2005, now Pat. No. 7,210,696.

(30) Foreign Application Priority Data

Apr. 29, 2004    (DE) .................. 20 2004 006 903 U

(51) Int. Cl.
*B62K 1/00* (2006.01)
(52) U.S. Cl. ......................... 280/287; 403/92
(58) Field of Classification Search ............... 280/278, 280/287; 403/91, 92, 83
See application file for complete search history.

(56) References Cited

U.S. PATENT DOCUMENTS

| 4,457,529 A | 7/1984 | Keine |
| 5,772,227 A | 6/1998 | Michail |
| 6,431,567 B2* | 8/2002 | Tsai ..................... 280/87.041 |
| 6,966,572 B2* | 11/2005 | Michelau et al. ........... 280/287 |
| 2002/0167143 A1 | 11/2002 | Shaw |
| 2003/0141695 A1 | 7/2003 | Chen |

FOREIGN PATENT DOCUMENTS

DE    10031235    1/2002

* cited by examiner

*Primary Examiner*—Kevin Hurley
(74) *Attorney, Agent, or Firm*—Hoffman, Wasson & Gitler

(57) ABSTRACT

A folding frame for a tricycle, scooter or child's bicycle has a front frame part on which the front wheels can be mounted and a rear frame part on which the rear wheels can be mounted. A swivelling joint with a front articulated part is mounted on the front frame part and a rear articulated part is mounted on the rear frame part. The first of the two articulated parts has a first recess and the second of the two articulated parts has a second and third recess. The first recess and the second recess are in alignment in the use position of use and the first recess and the third recess are aligned in the folded position. The first articulated part and the second articulated part are locked against one another in the use position and in the folded position via a pin which can be moved in the recesses.

5 Claims, 4 Drawing Sheets

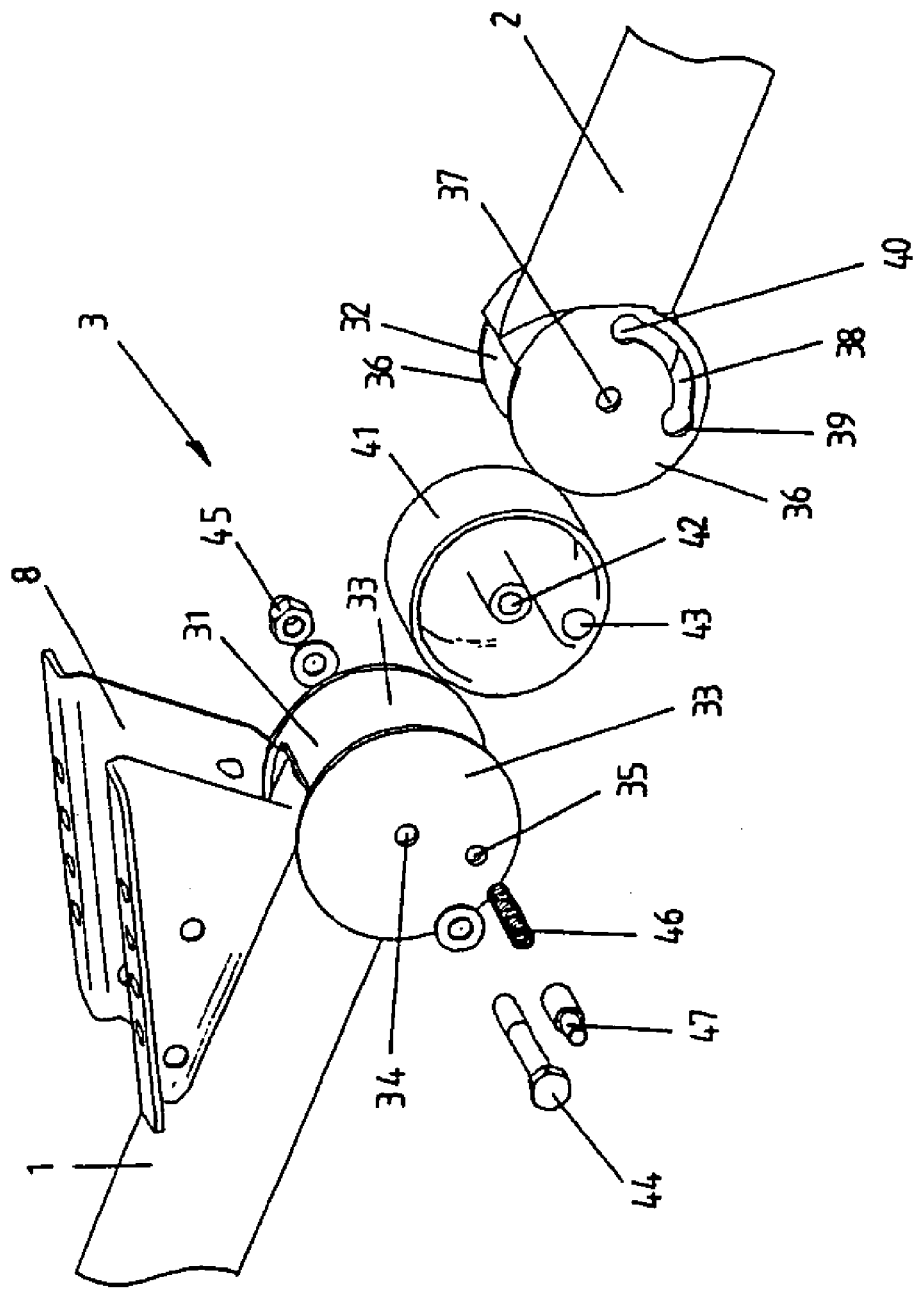

FOLDING FRAME FOR A TRICYCLE, SCOOTER OR CHILD'S BICYCLE

CROSS-REFERENCE TO RELATED APPLICATIONS

This application is a continuation of U.S. Ser. No. 11/081,875, filed Mar. 17, 2005 now U.S. Pat. No. 7,210,696.

BACKGROUND OF THE INVENTION

The invention relates to a folding frame for a tricycle, scooter or child's bicycle. The frame having a front frame part on which the front wheels can be mounted at least indirectly, and a rear frame part on which the rear wheels can be mounted. A swivelling joint with a front articulated part and a rear articulated part connects the front and the rear frame part. The front articulated part is mounted on the front frame part and the rear articulated part is mounted on the rear frame part.

Such a frame is known from a tricycle which is offered by the company Radio Flyer under the name "#21 Ready To Ride Trike". The tricycle can be folded up out of the position of use in order to be brought into a compact, space-saving position. The joint, and the locking mechanism for the joint, are extremely complex. The known tricycle has specifically a joint of different sheet metal parts which can be swivelled against one another and which can be swivelled around various swivelling axes against one another. The two frame parts are locked against one another in the position of use via a hook.

The production of the joint is complex in mounting and in storage.

It is an object of this invention is to provide a frame for a tricycle, scooter or child's bicycle which has a joint between a first frame part and a second frame part. The joint is structurally simple and has a simple locking mechanism.

SUMMARY OF THE INVENTION

An object is achieved by a frame which includes a first of the two articulated parts, specifically the front and the rear articulated part, which has a first recess and the second of the two articulated parts has a second recess and a third recess. The first recess and the second recess in the position of use of the frame are in alignment with one another, while the first recess and the third recess in the folded position are in alignment with one another. The first articulated part and the second articulated part can then be locked against one another in the position of use and in the folded position via a pin which can be moved in the recesses. The swivelling joint of the frame has only one swivelling axis. The frame with the swivelling joint is structurally simpler than the known frame and in particular does not have any pinching or shearing points which could be objectionable in terms of safety. The frame is therefore also especially suited for vehicles which are used by children.

Advantageously the pin in the frame can be moved parallel to the swivelling axis of the joint. But basically, it is also conceivable for the pin to be able to move at a right angle to the swivelling axis. In the position of use, and the folded position, the pin can be held by a spring in the two recesses which are in alignment. Thus the joint cannot unlock itself. On the other hand, the spring advantageously enables automatic locking of the joint in the position of use and/or in the folded position.

The second and the third recess can be joined to one another via a guide slot. The recesses are then advantageously provided as enlargements of the guide slot. These enlargements can then be located especially on the ends of the guide slot.

The pin can have a first segment, which in the position of use, and/or in the folded position, fits into the two recesses which are in alignment at the time. The pin can have a second segment which is offset relative to the first segment and which in the positions of the frame between the position of use and in the folded position fits into the guide slot.

In the frame, one of the two articulated parts can have a receiver in which the other articulated part is located with a swivelling capacity.

Furthermore the swivelling joint of a frame can have a holding part in which the pin is movably supported. In the holding part, there can be a recess which is in alignment with the first recess and in which the pin and the spring are located.

BRIEF DESCRIPTION OF THE DRAWINGS

A tricycle with a frame is detailed using the following drawings.

FIG. 4 shows an exploded view of the swivelling joint with bordering parts of the frame.

DETAILED DESCRIPTION OF THE INVENTION

Figure 1:
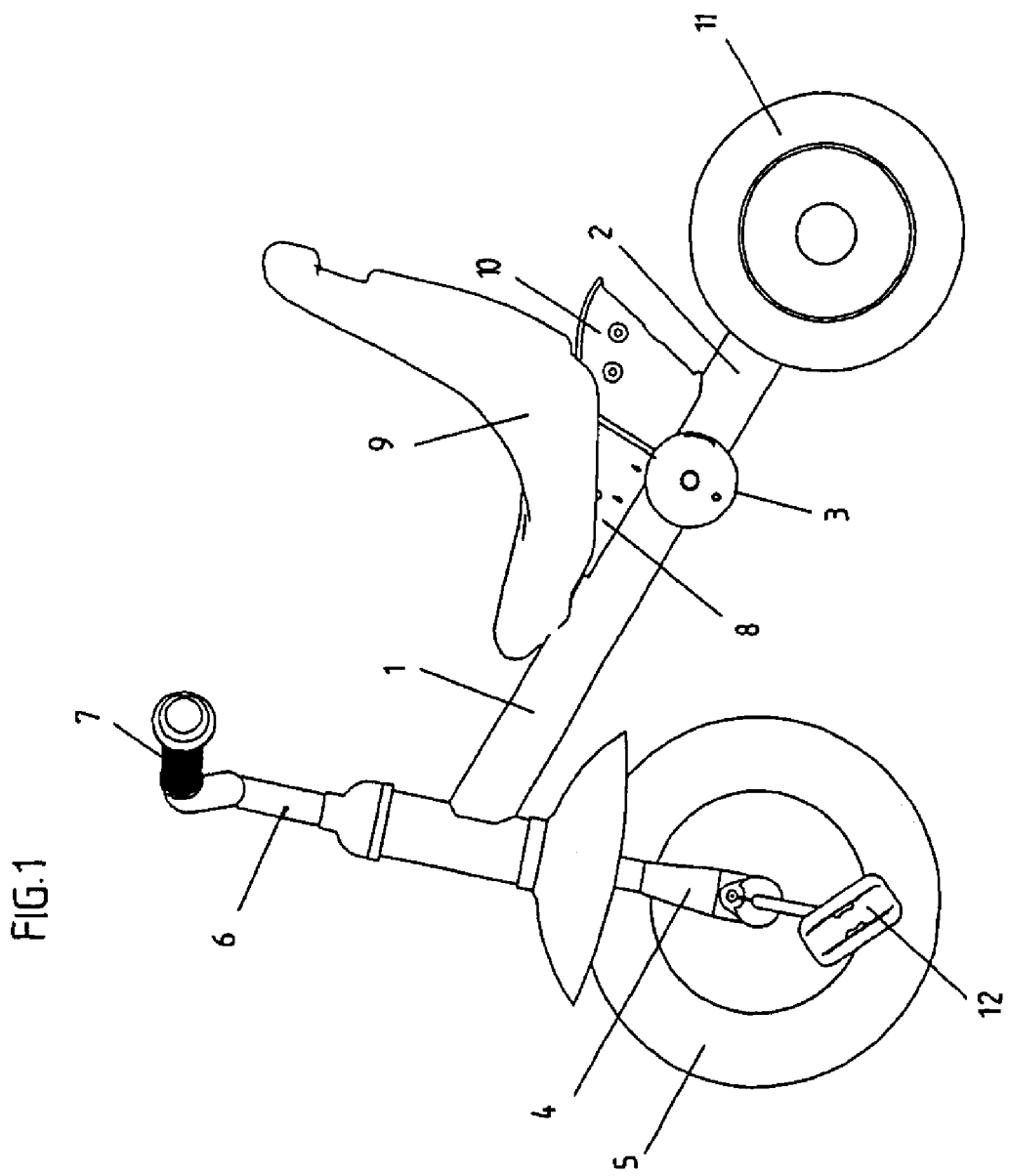
FIG. 1 shows the tricycle with the frame in the position of use.
Figure 2:
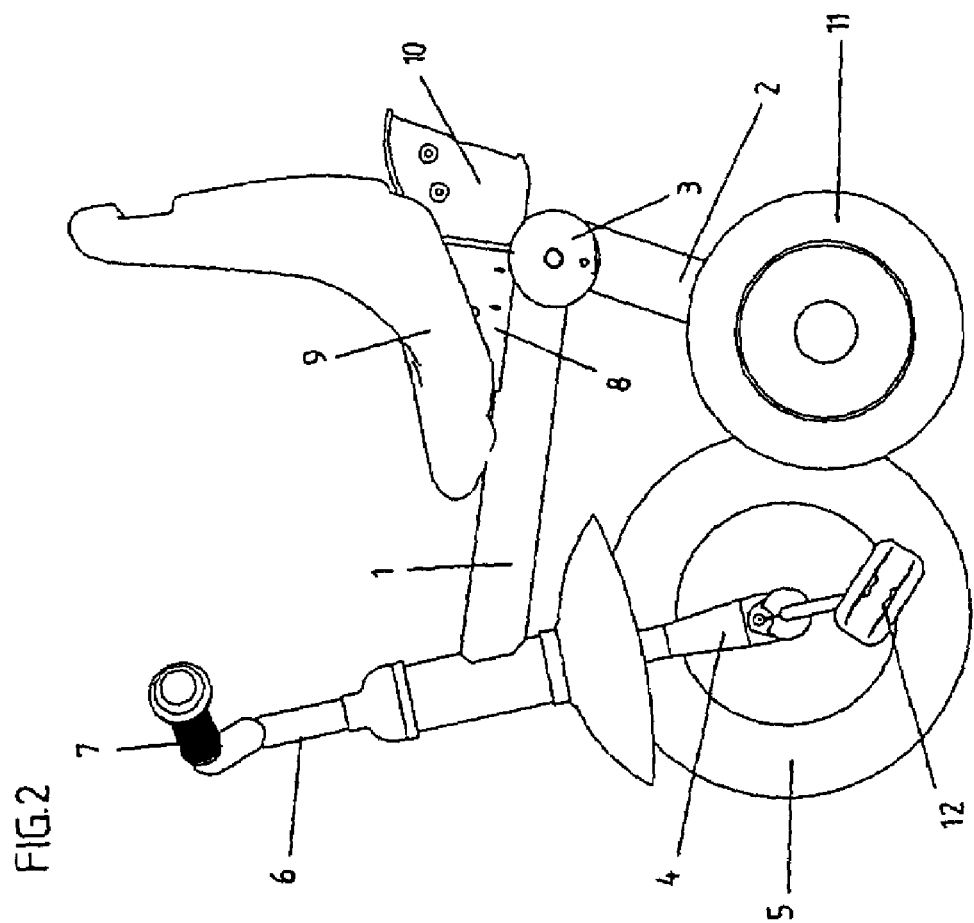
FIG. 2 shows the tricycle with the frame in the folded position.

The tricycle shown in FIGS. 1 and 2 has a frame consisting of a front frame part 1 and a rear frame part 2 which are joined to one another via a swivelling joint 3. In the front frame part, a fork 4 is pivotally mounted. The front wheels 5 are mounted on the fork 4. On the top end of the fork 4, there are the handlebar stanchion 6 and the handlebars 7. On the front frame part, a repeatedly bent sheet of metal 8 is mounted, to which the seat 9 is attached. The repeatedly bent sheet 8 has a receiver for a holding device 10 in which a connecting rod (not shown) can be inserted.

Proceeding from the swivelling joint 3, the rear frame part 2 branches so that it has two back ends. On these back ends, the wheels 11, which form the rear wheels of the tricycle, are mounted. The tricycle can be driven via pedals 12 on the front wheel.

Figure 3:
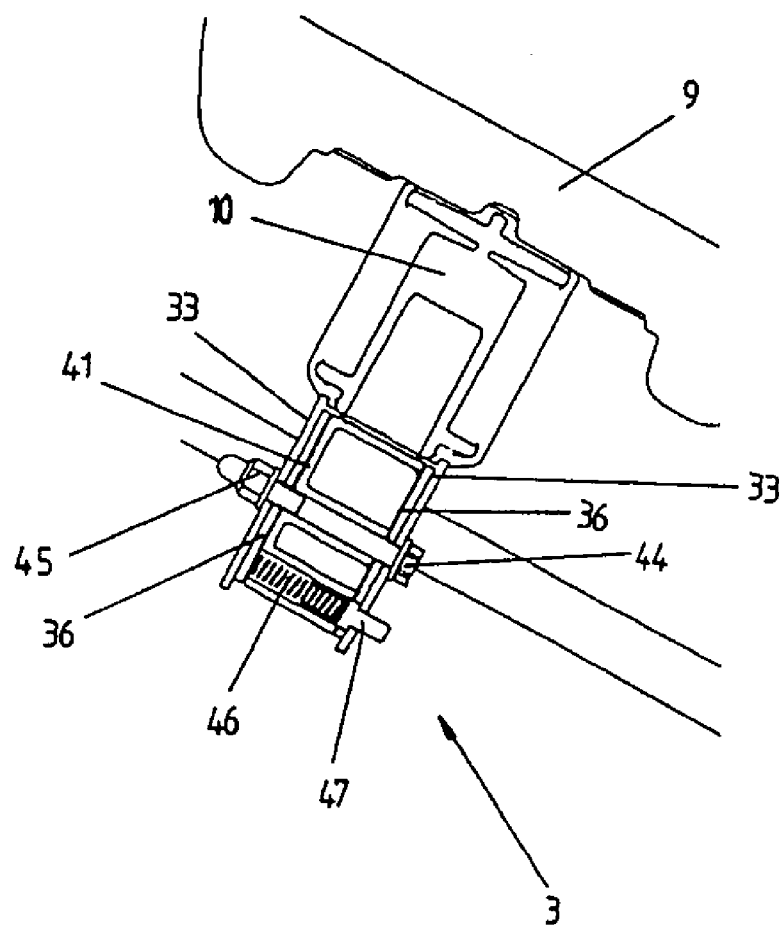
FIG. 3 shows a section through the swivelling joint.

The swivelling joint of the tricycle is described below using FIGS. 3 and 4. The swivelling joint 3 has a front articulated part 31 and a rear articulated part 32. The front articulated part 31 is mounted on the back end of the front frame part 1. The rear articulated part 32, conversely, is mounted on the front end of the rear frame part 2.

The front articulated part 31 has two circular disks 33 which are spaced part, parallel to one another, and which each have a central hole and holes 34 which are in alignment with one another. One of the circular disks 31 has a first eccentric hole 35 which forms a first recess.

The second articulated part 32 has two circular disks 36 which are spaced apart from one another and parallel to one another. These circular disks 36 have central holes 37 which are in alignment with one another. In one circular disk 36, of the second articulated part 32, there is a guide slot 38 with a second hole 39 on its one end and a third hole 40 on its other end, which form a second recess and a third recess. The second hole 39 is arranged such that it is in alignment with the first hole 35, on the first articulated part 31, in the position of use of the frame. The third hole 40, conversely, is in alignment with the first hole 35 of the first articulated part 31 in the folded position of the frame.

The distance of the surfaces of the two circular disks 36, of the second articulated part 32, which surfaces point to the outside, is dimensioned such that it is smaller than, or equal to, the distance of the surfaces of the circular disks 33, of the first articulated part, which surfaces point to the inside. The two circular disks 33, of the first articulated part, form a receiver into which the second articulated part 32 is inserted. The central holes 34 of the circular disks 33, of the first articulated part 31, are in alignment with the central holes 37 of the circular disks 36 of the second articulated part 32.

The swivelling joint 3 has a plastic injection molded part which is labeled as holding means 41 and which has essentially the shape of a hollow cylinder which is closed on one side. This hollow cylinder, on its closed side, has a central hole to which a sleeve 42 is attached inside. Furthermore, a sleeve 43, on the inside, is inserted into the interior of the hollow cylinder. The holding means 41 is inserted between the two disks 36 of the second articulated part 32, the central hole 37 being in alignment with the sleeve 42.

The holding means 41 is located between the disks 36 of the second articulated part 32, but is torsionally strong relative to the first articulated part 31. With respect to the first articulated part 31, the holding means 41 is arranged such that the sleeve 43 is in alignment with the first hole 35, regardless of the position of the frame. By means of a screw 44, which is inserted through the central holes 34, 37, of the circular disks 33 and 36, and through the central sleeve 42 of the holding means 41, and which is secured by a nut 45, the swivelling joint is held together.

In the sleeve 43, of the holding means 41, on the one hand a spring 46, and on the other hand, a pin 47, is inserted. The pin has a first segment, which is facing the spring, and a second segment which is offset from the first segment. The first segment has a diameter which corresponds to the inside diameter of the second hole 39, and the third hole 40, so that the pin can be inserted into these holes 39, 40. The second segment, conversely, has a diameter which is dimensioned such that the second segment can fit into the slot 38 of the circular disk 36 and can extend through the first hole 35.

In the position of use of the frame and in the swivelled-in position of the frame, the pin 47 with its first segment and the second segment is pushed through the second hole 39 and the third hole 40. The second segment then projects through the first hole 35. The offset between the first and the second segment adjoins the edge of the first hole 35. To swivel the frame, the pin 47 can be pressed from the outside against the pressure of the spring 46 to the inside. In this way, the pin, with its first segment, is lifted out of the second hole 39 and the third hole 40. The swivelling joint 43 is then unlocked. The first frame part 1 can then be swivelled against the second frame part 2. During swivelling, or in the position between the position of use and the folded position, the first segment of the pin 47 lies on the edge of the guide slot 38, while the second segment extends through the guide slot 38 and the first hole 35.

What is claimed is:

1. A folding frame for a tricycle, scooter or child's bicycle, comprising:
    a front frame part on which front wheels can be mounted,
    a rear frame part on which rear wheels can be mounted,
    a swivelling joint with a first front articulated part which is mounted on the front frame part, and with a second rear articulated part which is mounted on the rear frame part,
    the first articulated part terminating in a forked end, the first forked end having a first recess
    the second articulated part terminating in a forked end, the second forked end having a second recess and a third recess and fitting within the first forked end,
    a holding part retained within the second forked end,
    a pin within the holding part engaging the first recess and one of the recesses in the second forked end.

2. The frame of claim 1, wherein said forked ends are circular disks.

3. The frame of claim 1, further comprising a spring in said holding part, said spring urging the pin into contact with the first recess.

4. The frame of claim 2, wherein each circular disk has a central hole,
    the holding part having a central sleeve, and
    an axle extending through the central holes and central sleeve.

5. The frame of claim 4, wherein the holding part is circular.

* * * * *